United States Patent
Harnetiaux (10) Patent No.: US 10,111,374 B2
(45) Date of Patent: Oct. 30, 2018

(54) ROTATABLE TWO-POINT HITCH SYSTEM

(71) Applicant: CNH Industrial America LLC, New Holland, PA (US)

(72) Inventor: Travis Lester Harnetiaux, Bourbonneais, IL (US)

(73) Assignee: CNH Industrial America LLC, New Holland, PA (US)

( * ) Notice: Subject to any disclaimer, the term of this patent is extended or adjusted under 35 U.S.C. 154(b) by 289 days.

(21) Appl. No.: 15/073,205

(22) Filed: Mar. 17, 2016

(65) Prior Publication Data

US 2017/0265373 A1    Sep. 21, 2017

(51) Int. Cl.
    *A01B 59/042*      (2006.01)
    *A01B 63/14*      (2006.01)
    *B60D 1/00*      (2006.01)

(52) U.S. Cl.
    CPC ............ *A01B 59/042* (2013.01); *A01B 63/14* (2013.01); *B60D 2001/008* (2013.01)

(58) Field of Classification Search
    CPC ... A01B 59/042; A01B 71/066; A01B 69/004; A01B 63/14; B60D 1/44; B60D 1/02; B60D 1/143; B60D 1/07; B60D 1/52; B60D 1/54; B62D 1/28; B62D 53/02
    USPC ....... 172/439, 272, 273, 450, 446, 443, 449, 172/248, 679; 280/416.2, 494, 448, 463, 280/474, 499, 468
    See application file for complete search history.

(56) References Cited

U.S. PATENT DOCUMENTS

| | | |
|---|---|---|
| 3,056,458 A | 10/1962 | Gray |
| 3,380,537 A | 4/1968 | Morkoski |
| 3,386,518 A | 6/1968 | Mellen |
| 3,708,019 A | 1/1973 | Ryan |
| 4,216,975 A | 8/1980 | Schafer et al. |
| 4,272,097 A | 6/1981 | Cornelius |
| 4,304,303 A | 12/1981 | Lange |
| 4,357,031 A | 11/1982 | Berg |
| 4,552,375 A | 11/1985 | Kinzenbaw |
| 5,255,756 A * | 10/1993 | Follmer ............... A01B 69/004 172/6 |
| 5,423,394 A | 6/1995 | Kendle |
| 5,709,274 A * | 1/1998 | Herbold ................... B60D 1/07 172/248 |
| 6,196,327 B1 | 3/2001 | Patel et al. |
| 6,257,347 B1 | 7/2001 | Campisi |
| 6,371,215 B2 | 4/2002 | Friggstad |
| 6,742,600 B2 * | 6/2004 | Hoelscher ............ A01B 59/042 172/679 |
| 6,915,862 B2 | 7/2005 | Deves et al. |
| 7,204,318 B2 * | 4/2007 | Taylor ................. A01B 59/042 172/439 |
| 7,658,235 B2 | 2/2010 | Dahl et al. |

(Continued)

*Primary Examiner* — Robert E Pezzuto
(74) *Attorney, Agent, or Firm* — Rebecca L. Henkel; Rickard K. DeMille (57) ABSTRACT

A two-point hitch system includes an attachment assembly configured to attach the two-point hitch system to a towable implement. The two-point hitch system further includes a mount member mechanically coupled to the attachment assembly. The two-point hitch system additionally includes two rotatable ends rotatably coupled to the mount member; wherein each of the two rotatable ends comprise a removable fastener configured to attach the two-point hitch system to a towing vehicle via the two rotatable ends.

20 Claims, 6 Drawing Sheets

(56) References Cited

U.S. PATENT DOCUMENTS

| | | | |
|---|---|---|---|
| 8,555,995 B2 | 10/2013 | Harris | |
| 9,155,239 B2 | 10/2015 | Hatanaka et al. | |
| 9,873,300 B1* | 1/2018 | Gramlow | B60D 1/44 |
| 2007/0284851 A1* | 12/2007 | Adcock | B60D 1/44 |
| | | | 280/448 |
| 2012/0261899 A1 | 10/2012 | Ockunzzi | |

* cited by examiner

ROTATABLE TWO-POINT HITCH SYSTEM

BACKGROUND

This disclosure relates generally to agricultural hitch systems, and more particularly, to a rotatable two-point hitch system.

Agricultural vehicles (e.g., tractors, harvesters, etc.) are commonly used in a variety of agricultural tasks (e.g., to tow planters or seeders for planting seeds, to tow spraying implements for applying fertilizer, for harvesting agricultural product, etc.). The equipment towed behind agricultural vehicles typically includes a hitch system useful in mechanically coupling and uncoupling the towed equipment to the towing agricultural vehicle. In some cases, a two-point hitch system included in the towed equipment may be mechanically coupled to the towing agricultural vehicle. It may be useful to improve attachment mechanics of two-point hitches.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a two-point hitch system includes an attachment assembly configured to attach the two-point hitch system to a towable implement. The two-point hitch system further includes a mount member mechanically coupled to the attachment assembly. The two-point hitch system further includes two rotatable ends rotatably coupled to the mount member; wherein each of the two rotatable ends comprise a removable fastener configured to attach the two-point hitch system to a towing vehicle via the two rotatable ends.

In another embodiment, a two-point hitch system includes an attachment assembly configured to attach the two-point hitch system to a towable implement. The two-point hitch system additionally includes a mount member connected to the attachment assembly. The two-point hitch system also includes two rotatable ends rotatably coupled to the mount member; wherein each of the two rotatable ends comprise a removable fastener configured to attach the two-point hitch system to a towing vehicle, to an agricultural implement, or to a combination thereof, via the two rotatable ends.

In a further embodiment, a two-point hitch system includes an attachment assembly configured to attach the two-point hitch system to a towable implement. The two-point hitch system further includes a mount member mechanically coupled to the attachment assembly. The two-point hitch system also includes two rotatable ends rotatably coupled to the mount member; wherein each of the two rotatable ends comprise a removable fastener configured to attach the two-point hitch system to a towing vehicle, to an agricultural implement, or to a combination thereof, via the two rotatable ends. The two-point hitch system additionally includes a control system operatively coupled to the two rotatable ends and configured to rotate the two rotatable ends.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In many agricultural operations, agricultural vehicles are commonly used to perform a variety of tasks (e.g., towing planters or seeders for planting seeds, towing spraying implements for applying fertilizer, harvesting agricultural product, plowing, preparing beds, etc.) in order to increase the efficiency or output of the agricultural operation. The agricultural vehicle may tow an agricultural implement (e.g., planter, seeder, fertilizing system, plowing system, and so on). The agricultural implement may include a two-point hitch system, as further described below, useful in mechanically coupling the agricultural implement to the agricultural vehicle for transport and/or for agricultural operations. The agricultural vehicle may include a two-point hitch system, a three-point hitch system, and in some cases, a drawbar system, useful in coupling with the agricultural implement's two-point hitch system.

The two-point hitch system described herein provides for rotatable attachment points suitable for varying, for example, the height of the attachment points and thus the height of the two-point hitch system. It is to be noted that, unlike a three-point hitch system, which includes three attachment points, the two-point hitch system includes two attachment points as further described below. Accordingly, the mechanical coupling of the agricultural implement to the agricultural vehicle may be made more efficient, for example, by rotating the agricultural implement's attachment points to a current height of the agricultural vehicle's attachment points.

For example, typical three-point hitches on tractors may have limited travel distance (e.g., vertical distance between low position and high position). The travel distance may also be affected by other factors, such as tractor wheel size. For example, larger wheels will raise the three-point hitch overall, and thus result in a low position that may be higher than usual. Limited vertical travel of the tractor's hitch may also cause issues with the agricultural implement height in operational position (e.g., planting height) and in transport position. The transport position may result in a height that may not be high enough to go over certain obstacles and the operational position may result in height too low such that certain equipment (e.g., the two-point hitch) is dragging on the ground. By varying the two-point hitch system's vertical attachment position, such issues may be minimized or eliminated.

Figure 1:
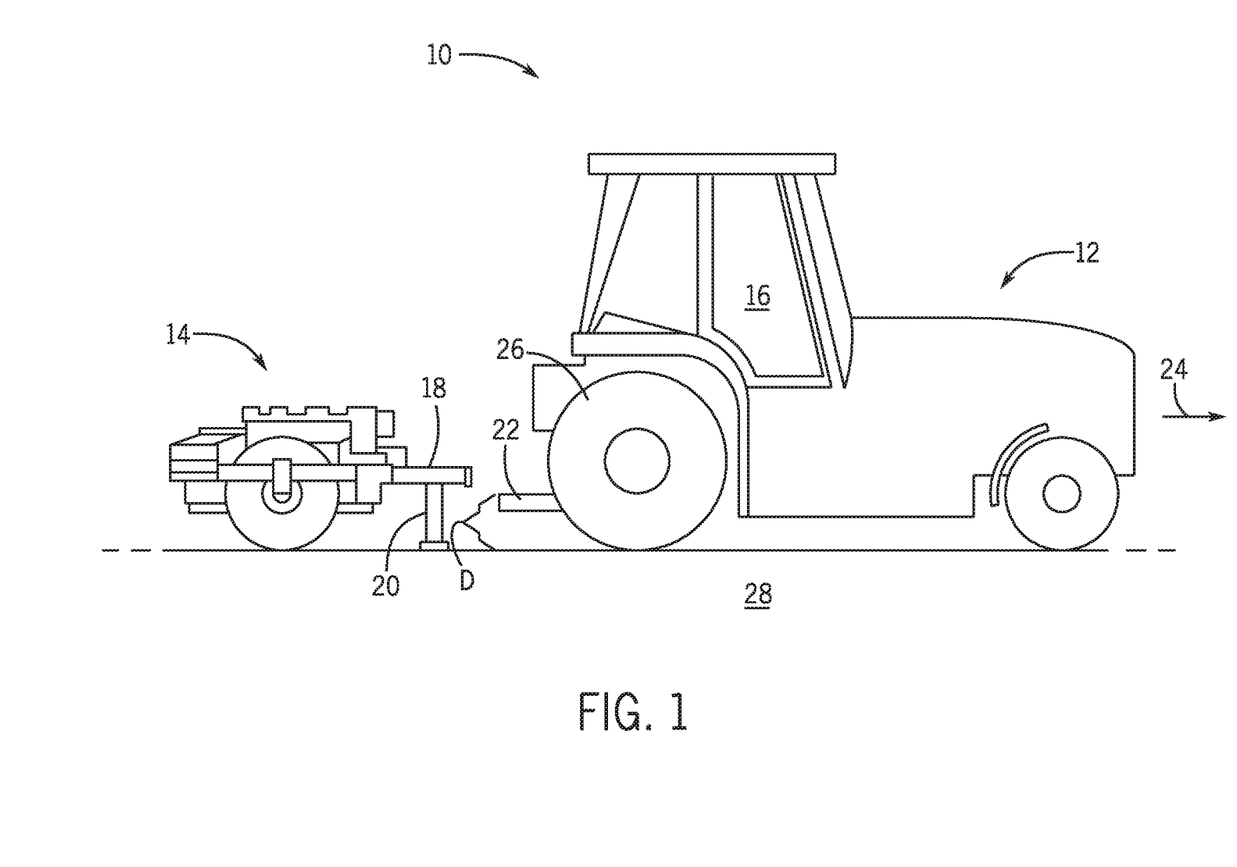
FIG. 1 is a side view of an embodiment of an agricultural system including a two-point hitch system.

FIG. 1 is a side view of an embodiment of an agricultural system 10. The agricultural system 10 includes an agricultural vehicle 12 and an agricultural implement 14. In some embodiments, the agricultural implement 14 may be towed behind the agricultural vehicle 12 (e.g., as shown in FIG. 1). In other embodiments, the agricultural implement 14 may be incorporated into the agricultural vehicle 12 (e.g., combines, windrowers, forage harvesters, sugar cane harvesters, etc.). The agricultural vehicle 12 may be any vehicle suitable for towing the agricultural implement 14, such as a tractor, off-road vehicle, work vehicle, or the like. The agricultural vehicle 12 may include a cab 16, in which an operator sits during operation of the agricultural vehicle 12. The cab 16 may be an open or closed cab 16. Additionally, the agricultural implement 14 may be any suitable implement, such as a ground-engaging implement (e.g., a soil conditioner, a tillage implement, a fertilizer application implement, a planter, a seeder, etc.) or a sprayer/applicator, suitable for agricultural use.

The agricultural implement 14 may be coupled to the agricultural vehicle 12 via a hitch system 18. In one embodiment, the hitch 18 may be a two-point hitch that rigidly couples the implement 14 to the vehicle 12, such that the implement 14 can move upward and downward, but cannot freely rotate with respect to the vehicle 12. As illustrated, the two-point hitch system 18 is shown in a parked position, with legs 20 lowered to contact a ground and thus aid in supporting the front of the agricultural implement 14. The vehicle 12 may include an attachment system 22, such as a three-point hitch, a two-point hitch, and/or a drawbar. It should be understood, however that other systems for coupling the implement 14 to the vehicle 12 may be possible. In some embodiments, the implement 14 may be coupled to the front of the vehicle 12. The agricultural system 10 travels over a surface, such as the ground, a road, a field, or another surface. The vehicle 12 is configured to tow the agricultural implement 14 in a direction of travel 24.

As illustrated, the vehicle 12 includes two or more rear tires 26. Depending on a size for tires 26, a vertical distance D to ground 28 between the attachment system 22 and the ground 28 may vary. Larger tires 26 will typically increase the distance D, while smaller tires 26 will typically decrease the distance D. The techniques described herein provide for adjustments to the hitch system 18 so that a variety of distances D are more easily accommodated. Additionally, the techniques described herein may provide for more convenient attachment and towing of the implement 14 in a variety of ground 28 conditions and travel modes, including transportation travel modes as well as operational travel modes.

Figure 2:
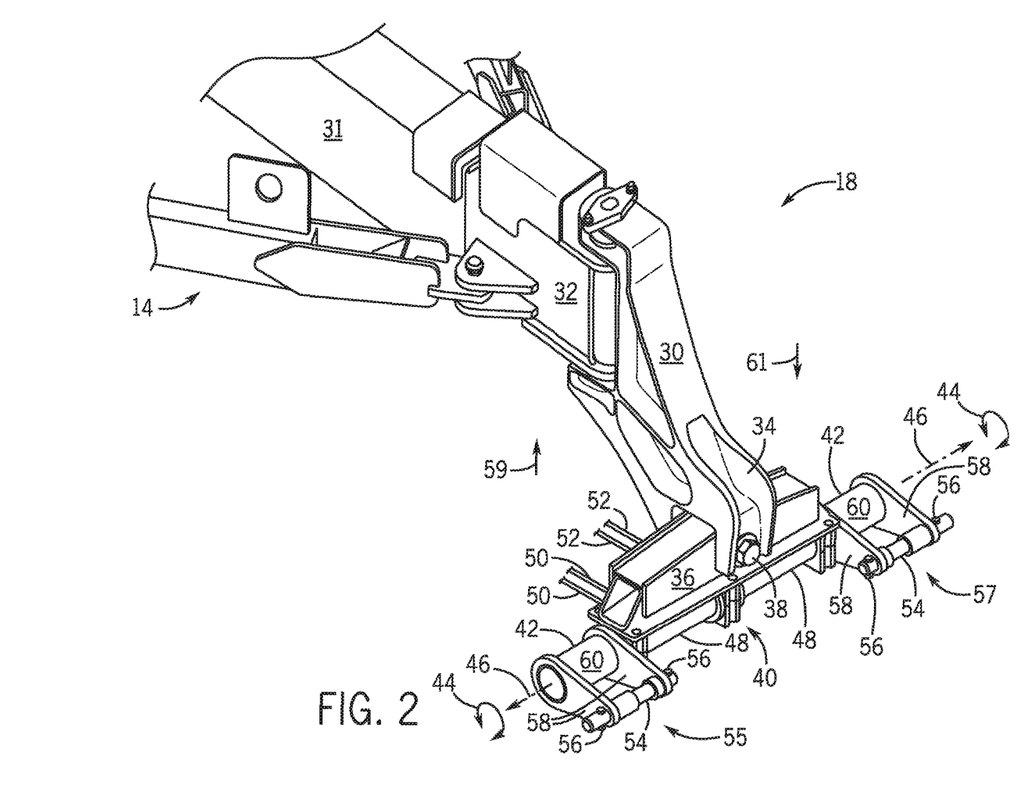
FIG. 2 is a perspective view of one embodiment of the two-point hitch system shown in FIG. 1 with rotatable ends in an "up" position.

FIG. 2 is a perspective view of an embodiment of the hitch system 18 of the agricultural implement 14 shown in FIG. 1. In the illustrated embodiment, the hitch system 18 includes an attachment assembly 30 mechanically coupled to a tow bar 31, and more specifically, to section 32 of the tow bar 31. The tow bar 31 may be used, for example, to tow the agricultural implement 14. As shown, a bottom section 34 of the attachment assembly 30 is mechanically coupled to a top mount member 36 via a bolt 38. In turn, the top mount member 36 is mechanically coupled to or may include a rotatable 2-point attachment system 40. The rotatable 2-point attachment system 40 includes two rotatable ends 42. The rotatable ends 42, may, as further described below, rotate a number of degrees 44 (e.g., 0 to 360 degrees or less, and/or free rotate) about an axis 46, thus providing for different angles of rotation and attachment heights.

The rotatable ends 42 are rotatably coupled to a bottom member 48. In some embodiments, the bottom member 48 may include certain hydraulic, pneumatic, and/or electric systems suitable for rotating the two rotatable ends 42. In the depicted embodiment, hydraulic lines 50 and electric conduits 52 are shown, fluidly and electrically coupled to the bottom member 48. The hydraulic lines 50 and electric conduits 52 may be connected to hydraulic power systems of the agricultural implement 14 and/or of the vehicle 12. Accordingly, the rotatable ends 42 may be rotated to a desired angle via the agricultural implement 14 and/or of the vehicle 12, and then locked. In certain embodiments, the rotatable ends 42 may additionally or alternatively be rotated manually. For example, an operator may manually rotate the rotatable ends 42 to a desired angle, thus arriving at a height more suitable for attaching the agricultural implement 14 to the vehicle 12, and then locked. It is to be noted that the rotable ends 42 may be coupled to each other, for example, via a rod, a tube, a cylinder, or other device, so that rotation of one rotatable end 42 results in an equal rotation of the other rotatable end 42.

Once the rotatable ends 42 are locked, for example, in an "up" position shown, a fastener, such as a metal rod 54, may be used to mechanically couple the two-point hitch system 18 to the attachment system 22. More specifically one of the ends 42 and rods 54 may define a first attachment point 55, and the other end 42 and rod 54 may define a second attachment point 57. The two attachment points 55, 57, may then be mechanically fastened, for example, onto the attachment system 22. It is to be noted that while the hitch system 18 is illustrated as being attached via the section 30 to the agricultural implement 14, in other embodiment, the hitch system 18 may be included in the towing vehicle 12 in lieu of the attachment system 22. In this embodiment, the agricultural implement 14 may then include the attachment system 22.

The fastener 54 may be removed, for example via cotter pins 56 or other securement device, from the rotatable ends 42. As shown, the rotatable ends 42 include two metal plates 58 connected to a cylindrical member 60. In turn, the cylindrical member 60 may be rotatably coupled to the bottom member 48, for example, via bearing systems (e.g., ball bearing systems, journal bearing and rod systems, fluid bearing systems), and the like. By providing for rotatable ends 42, the two-point hitch system 18 may enable more efficient attachment and comfortable towing of the agricultural implement 14 over a variety of transportation modes, terrains, and tire 26 sizes.

It is to be noted that the rotatable ends 42 may move in an up direction 59 and a down direction 61 relative to, for example, ground. Indeed, by rotating about the bolt 38, the top mount member 36 may rotate while the attachment assembly 30 remains stationary. In this manner, the two-point hitch assembly when attached to the towing vehicle 12, may more comfortably follow contours in the ground. As ground contours raise or lower a level of the ground, the top mount member 36 may rotate about the bolt 38, thus improving ground contact.

Figure 3:
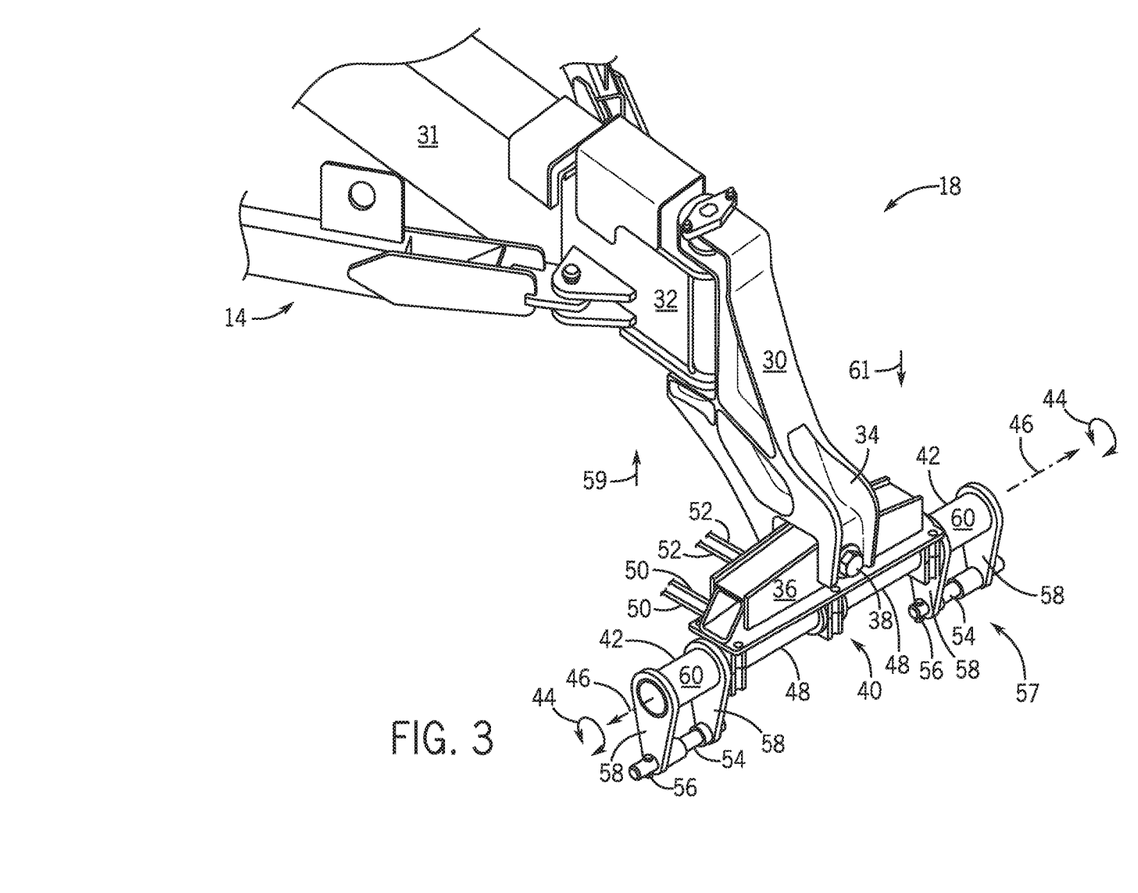
FIG. 3 is a perspective view of one embodiment of the two-point hitch system shown in FIG. 1 with rotatable ends in an "down" position.

Turning now to FIG. 3, the figure illustrates a perspective view of an embodiment of the hitch system 18 of the agricultural implement 14 shown in FIG. 2. Because like elements are used in the figure as those in FIG. 2, the figure uses like element numbers. In the illustrated embodiment, the rotatable ends 42 of the two-point hitch system 18 are depicted in a "down" position. As mentioned above, the rotatable ends 42 may be rotated manually, via the hydraulic lines 50, and/or electrically via the conduits 52 to a desired position, such as the down position illustrated.

In the down position, the rotatable ends 42 may be rotatably positioned so that the fastener 54 is lowered as far as possible. In this position, the fastener 54 may be used, for example, to mechanically couple the agricultural implement 14 to vehicles 12 having smaller tire 26 sizes, or when additionally height to raise the agricultural implement 14 is desired. Indeed, the rotable ends 42 may be moved to a number of desired degrees in order to better adjust a height and a position of the fastener 54.

Figure 4:
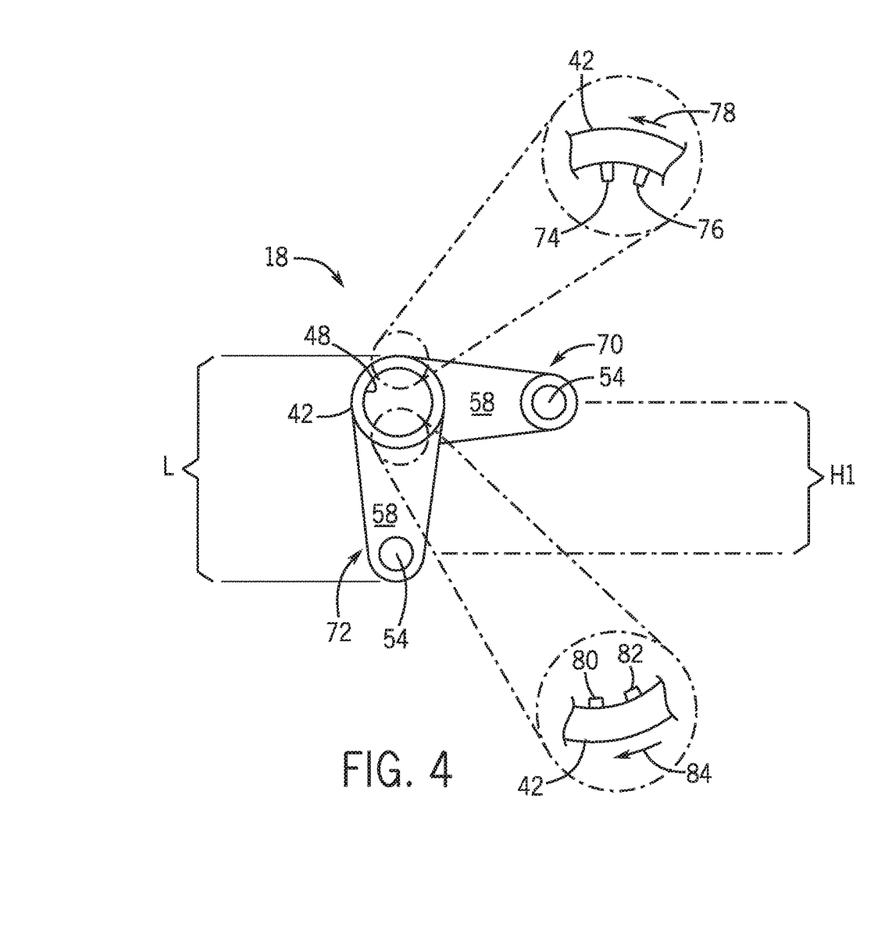
FIG. 4 is a side view of an embodiment of the two-point hitch system shown in FIG. 1 with rotatable ends in two positions.

FIG. 4 illustrates a side view of an embodiment of one of the two rotatable ends 42 of the rotatable two-point hitch system 18 in a top position 70 and then rotated to a bottom position 72 (or vice versa). In the depicted embodiment, a change in height H1 may be adjustably provided by moving between the top position 70 and the bottom position 72 (or vice versa). The height H1 is dependent on a length L of the metal plates 58. Longer plates 58 may result in higher height H, and thus provide for more height adjustment. However, shorter plates 58 may protrude outwardly less when compared to longer plates 58, and may thus provide for improved ease of attachment to the attachment system 22. In the depicted embodiment, the rotation between the up position and the down position is of 90 degrees. In other embodiments, the rotatable arm may free rotate, thus rotate between 0 and 360 degrees, as further described below.

In certain embodiments, free rotation may not be provided, and certain features may be used to restrict rotation to specific rotation ranges, such as rotation range between the top position and the bottom position shown. More specifically, a fixed stopping member 74 may be disposed, for example, inside of the bottom member 48. A movable stopping member 76 may be disposed in the rotatable end 42 and placed to protrude into the bottom member 48. As the rotatable end 42 is moved in a direction 78, the movable stopping member 76 may abut against the fixed stopping member 74, thus restricting further rotation in the direction 78. Likewise, a fixed stopping member 80 may be disposed inside of the bottom member 48. Another movable stopping member 82 may be disposed in the rotatable end 42 and placed to protrude into the bottom member 48. As the rotatable end 42 is moved in a direction 82, the movable stopping member 82 may abut against the fixed stopping member 74, thus restricting further rotation in the direction 84.

Figure 5:
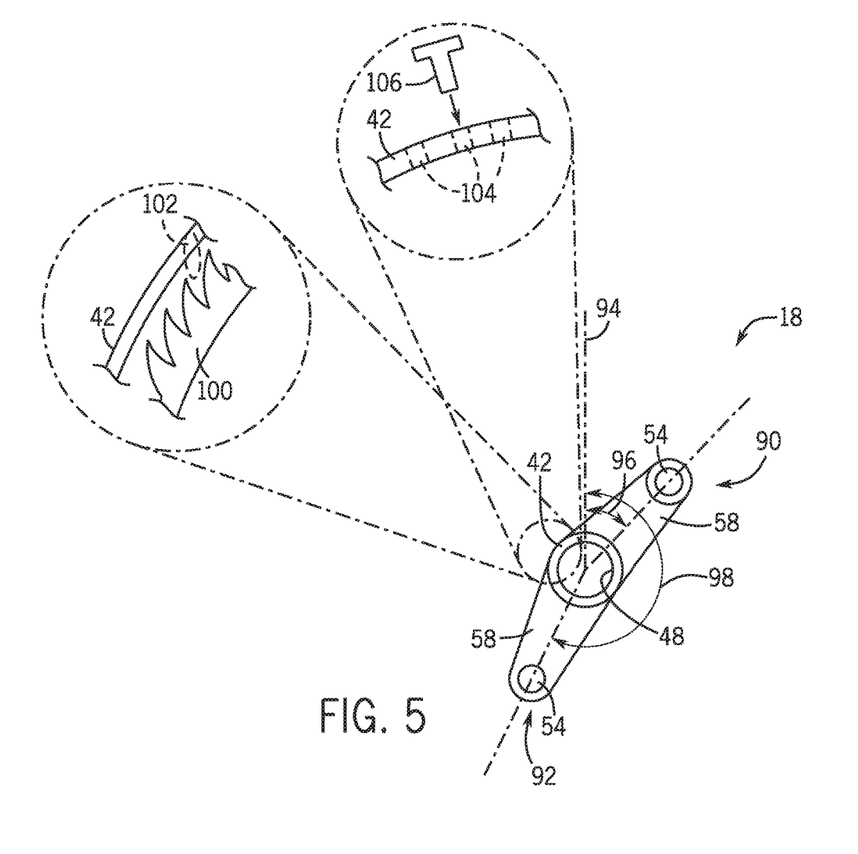
FIG. 5 illustrates a side view of an embodiment of the two rotatable ends shown in FIG. 1 rotated at two different angles.

FIG. 5 illustrates a side view of an embodiment of one of the two rotatable ends 42 of the rotatable two-point hitch system 18 in a position 90 and then rotated to a position 92 (or vice versa). In this embodiment, a free, (but lockable) rotation may be enabled to any number of angles with respect to an axis 94, such as between 0 and 360 degrees or more, in a clockwise and/or in a counterclockwise direction. As shown, the rotatable end 42 may be disposed and locked at an acute angle 96 (e.g . . . , position 90), and/or in an obtuse angle 98 (e.g., position 92). Indeed, acute and obtuse angles of any degrees may be achieved via manual, hydraulic, and/or electrically powered techniques.

Locking embodiments may include a ratchet 100 and pawl 102 mechanism, as shown. Other locking embodiments include a plurality of openings 104 suitable as locking receptacles for the introduction of a locking rod or key 106. When the locking key 106 is inserted into the openings 104, then the key 106 may abut (internally or externally) against walls or stopping members that would prevent further movement of the rotatable end 42. By enabling a rotatable, lockable end 42, the techniques described herein may enable a user to more accurately position the two-point hitch system 18 for attachment to the vehicle 12 and for more comfortable use.

Figure 6:
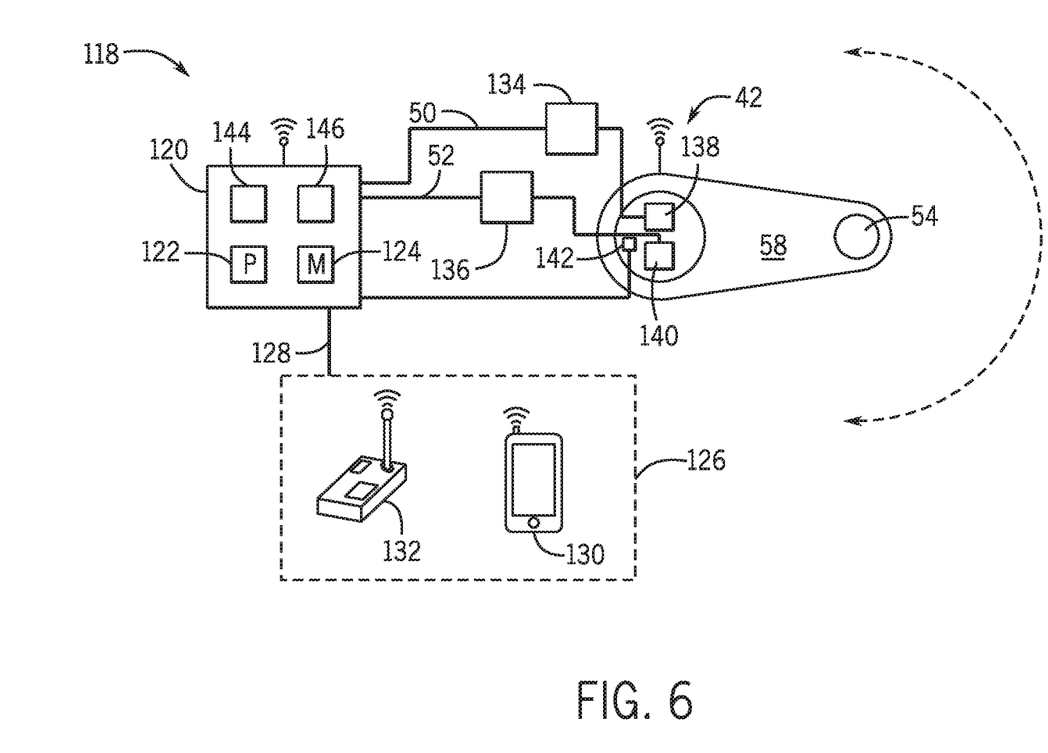
FIG. 6 block diagram a control system suitable for controlling the two rotatable ends shown in FIG. 1.

FIG. 6 is a block diagram illustrating embodiments of a control system 118 that may be operatively coupled to the two-point hitch system 18 to provide for control of the rotatable ends 42. For example, control system 118 may include an electronic controller 120, which in turn includes one or more processors 122 and a memory 124. The processors 122 may execute computer code or instructions stored, for example, in the memory 126. In one embodiment, the controller 120 may be communicatively coupled to a remote control system 126 also included in the control system 118. Electrical conduits 128 and/or wireless techniques (e.g., Bluetooth, WiFi, ZigBee, mesh networking) may be used to communicate between the controller 120 and the remote control system 126. The remote control system 126 may have one or more user input devices, such as a mobile device 130 and a dedicated remote 132. The mobile device 130 may be a smartphone, a tablet, a notebook, a smart wristwatch, and the like.

In use, the remote control system 128 (e.g., the mobile device 130 and/or the dedicated input device 132) may communicate with the controller 120 to issue certain commands, such as clockwise rotation of the rotatable ends 42, counterclockwise rotation of the rotatable ends 42, and/or locking of the rotatable ends 42. The control system 118 (e.g., the controller 120) may then actuate certain power sources, such as a hydraulic power source 134 and/or an electric power source 136 which may deliver hydraulic and electric power respectively, through hydraulic lines 50 and conduits 52. Certain actuators, such as hydraulic actuators 138 and electric actuators 140 may be disposed, for example, in the bottom member 48 and used to rotate the rotatable ends 42. Sensor(s) 142, such as angle position sensors (e.g., direct angle sensors, rotary position sensors, non-contact angular position sensors) may be used to provide a signal representative of an angular position of the rotatable ends 42. When a desired angle of rotation is reached, then the controller 120 may stop actuating the actuators 138, 140.

The angular position as derived, for example, via the sensor(s) 142 may additionally be communicated back to the remote control system 126 (e.g., the mobile device 130 and/or the dedicated remote 132). Accordingly, a user may view the angle of the rotatable ends 42, and reposition the rotatable ends 42 as desired. Additionally, the user may enter certain information, such as towing vehicle 10 tire size, type, model, and/or attachment system 22 type or model, and the controller 120 may then rotate the rotatable ends 42 to a position more optimal to couple the agricultural implement 14 to the towing vehicle 12. Also shown are a display 144 and an input device 146 (e.g., joystick, keys, keyboard). The display may also present the current angle of rotation of the rotatable ends 42, and the input device 146 may be used to control rotation of the rotatable ends 42.

Present embodiments may include rotatable ends on a two-point hitch system suitable for rotating attachment points at a number of angles. Rotation of the attachment points may lower or raise the attachment points in relation to a vehicle attachment system. The two-point hitch system includes stopping members configured to restrict a rotation of one or both of the rotatable ends. The two-point hitch system additionally includes the rotatable ends comprise a locking device configured to lock each of the rotatable ends in place. Controller embodiments are also provided, suitable for operating the two-point hitch system to rotate the rotable ends at a variety of desired angles. The control system may be communicatively coupled to remote control devices, such as a mobile device. The remote control devices may command the rotation of the rotable ends at a variety of desired angles. The remote control devices may also receive sensor signals representative of the current angle of rotation, and display the current angle of rotation.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A two-point hitch system, comprising:
an attachment assembly configured to attach the two-point hitch system to a towable implement;
a mount member mechanically coupled to the attachment assembly; and
two rotatable ends rotatably coupled to the mount member, each rotatable end of the two rotate ends configured to rotate between 0 and 360 degrees, each rotatable end configured to rotate independently; wherein each of the two rotatable ends comprise a removable fastener configured to attach the two-point hitch system to a towing vehicle, to an agricultural implement, or to a combination thereof, via the two rotatable ends.

2. The two-point hitch system of claim 1, comprising a first stopping member configured to restrict a rotation of one or both of the rotatable ends.

3. The two-point hitch system of claim 2, comprising a second stopping member disposed in the one of the rotatable ends, wherein the first stopping member is disposed in the mount member and is configured to abut against the second stopping member to restrict the rotation.

4. The two-point hitch system of claim 1, wherein each of the two rotatable ends are rotatably coupled to the mount member via a bearing system.

5. The two-point hitch system of claim 4, wherein the bearing system comprises a ball bearing system, a journal bearing system, or a combination thereof.

6. The two-point hitch system of claim 1, wherein at least one of the rotatable ends comprises a locking device configured to lock the at least one of the rotatable ends in place.

7. The two-point hitch system of claim 6, wherein the locking device comprises a ratchet and pawl system, a plurality of openings and a locking rod, or a combination thereof.

8. The two-point hitch system of claim 1, comprising hydraulic lines, conduits, or a combination thereof, wherein the hydraulic lines provide for a hydraulic fluid to rotate the rotatable ends, and wherein electrical conduits provide for electric power to rotate the rotatable ends, or a combination thereof.

9. The two-point hitch system of claim 8, comprising a control system operatively coupled to the two rotatable ends via hydraulic lines, conduits, or a combination thereof, and wherein the control system is configured to rotate the two rotatable ends via the hydraulic lines, the conduits, or the combination thereof.

10. A two-point hitch system, comprising:
an attachment assembly configured to attach the two-point hitch system to a towable implement;
a mount member connected to the attachment assembly; and
two rotatable ends rotatably coupled to the mount member, each rotatable end of the two rotatable ends configured to rotate between 0 and 360 degrees, each rotatable end configured to rotate independently; wherein each of the two rotatable ends comprise a removable fastener configured to attach the two-point hitch system to a towing vehicle, to an agricultural implement, or to a combination thereof, via the two rotatable ends.

11. The two-point hitch system of claim 10, wherein at least one of the rotatable ends comprises a locking device configured to lock the at least one of the rotatable ends in place.

12. The two-point hitch system of claim 10, comprising a stopping member configured to restrict a rotation of one of the rotatable ends.

13. The two-point hitch system of claim 10, comprising a control system operatively coupled to the two rotatable ends and configured to rotate the two rotatable ends.

14. The two-point hitch system of claim 13, wherein the control system comprises:
an electronic controller; and
a dedicated remote, a mobile device, or a combination thereof, communicatively coupled to the electronic controller and configured to command rotation of the two rotatable ends.

15. A two-point hitch system, comprising:
an attachment assembly configured to attach the two-point hitch system to a towable implement;
a mount member mechanically coupled to the attachment assembly; and
two rotatable ends rotatably coupled to the mount member, each rotatable end of the two rotatable ends configured to rotate between 0 and 360 degrees, each rotatable end configured to rotate independently; wherein each of the two rotatable ends comprise a removable fastener configured to attach the two-point hitch system to a towing vehicle, to an agricultural implement, or to a combination thereof, via the two rotatable ends; and
a control system operatively coupled to the two rotatable ends and configured to rotate the two rotatable ends.

16. The two-point hitch system of claim 15, comprising hydraulic lines, conduits, or a combination thereof, wherein the hydraulic lines provide for a hydraulic fluid to rotate the rotatable ends, wherein electrical conduits provide for electric power to rotate the rotatable ends, or a combination thereof, wherein the control system is operatively coupled to the two rotatable ends via the hydraulic lines, the conduits, or the combination thereof, and wherein the control system is configured to rotate the two rotatable ends via the hydraulic lines, the conduits, or the combination thereof.

17. The two-point hitch system of claim 15, wherein the control system comprises an electronic controller, and a dedicated remote, a mobile device, or a combination thereof, communicatively coupled to the electronic controller and configured to command rotation of the two rotatable ends.

18. The two-point hitch system of claim 15, comprising a stopping member configured to restrict a rotation of one of the rotatable ends.

19. The two-point hitch system of claim 15, wherein each of the rotatable ends comprise a locking device configured to lock each of the rotatable ends in place.

20. The two-point hitch system of claim 15, wherein the removable fastener comprises a rod.

\* \* \* \* \*